United States Patent
Dubray et al.

(10) Patent No.: US 10,142,029 B2
(45) Date of Patent: Nov. 27, 2018

(54) DEVICE FOR MODULATING THE INTENSITY OF AN OPTICAL SIGNAL ON FOUR DIFFERENT LEVELS

(71) Applicant: Commissariat A L'Energie Atomique et aux Energies Alternatives, Paris (FR)

(72) Inventors: Olivier Dubray, Grenoble (FR); Benjamin Blampey, Albens (FR); Sylvie Menezo, Voiron (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 14 days.

(21) Appl. No.: 15/345,836

(22) Filed: Nov. 8, 2016

(65) Prior Publication Data
US 2017/0141852 A1    May 18, 2017

(30) Foreign Application Priority Data
Nov. 16, 2015   (FR) ...................................... 15 60976

(51) Int. Cl.
*H04B 10/54*      (2013.01)
*G02F 1/025*      (2006.01)
(Continued)

(52) U.S. Cl.
CPC ............. *H04B 10/54* (2013.01); *G02F 1/025* (2013.01); *G02F 1/225* (2013.01); *H04B 10/501* (2013.01);
(Continued)

(58) Field of Classification Search
None
See application file for complete search history.

(56) References Cited

U.S. PATENT DOCUMENTS

| 5,369,383 A * | 11/1994 | Takahashi | ........... H01P 1/20381 |
| | | | 333/204 |
| 2003/0128415 A1* | 7/2003 | Kalluri | ................ G02F 1/225 |
| | | | 359/238 |

(Continued)

FOREIGN PATENT DOCUMENTS

EP        2 843 468 A2    3/2015

OTHER PUBLICATIONS

Lucas B. Soldano et al. Optical Multi-Mode Interference Devices Based on Self-Imaging: Principles and Applications, Journal of Lightwave Technology, vol. 13, No. 4, 1995, 13 pages.
C.S. Hsiao et al. "Design for beam splitting components employing silicon-on-insulator rib waveguide structures" Optics Letters, vol. 30, No. 23, 2005, 3 pages.
(Continued)

*Primary Examiner* — Ken N Vanderpuye
*Assistant Examiner* — David Lambert
(74) *Attorney, Agent, or Firm* — Oblon, McClelland, Maier & Neustadt, L.L.P.

(57) ABSTRACT

Device for modulating the intensity of an optical signal on four levels, this device comprising:
 a first resonant ring modulator comprising an output port capable of delivering a first modulated optical signal,
 a second resonant ring modulator comprising an output port capable of delivering a second modulated optical signal,
 an optical assembler comprising:
  a first input optically coupled to the output port of the second resonant ring modulator,
  a second input optically coupled to the output port of the first resonant ring modulator, and
  an output capable of delivering the optical signal of which the intensity is modulated on four different levels constructed by combining the optical signals received on its first and second inputs.

16 Claims, 3 Drawing Sheets

(51) Int. Cl.
  *G02F 1/225* (2006.01)
  *H04B 10/50* (2013.01)
  *G02F 1/21* (2006.01)

(52) U.S. Cl.
  CPC ..... *H04B 10/541* (2013.01); *G02F 2001/217* (2013.01)

(56) References Cited

U.S. PATENT DOCUMENTS

| | | | |
|---|---|---|---|
| 2008/0219614 A1 | 9/2008 | Gill et al. | |
| 2009/0244685 A1* | 10/2009 | Hoshida | G02F 1/0123 359/279 |
| 2015/0316794 A1* | 11/2015 | Hayakawa | H04B 10/501 385/2 |
| 2017/0059893 A1* | 3/2017 | Lemaitre | G02F 1/225 |

OTHER PUBLICATIONS

French Preliminary Search Report dated Aug. 22, 2016 in French Application 15 60976, filed on Nov. 16, 2015 (with English Translation of Categories of Cited Documents and Written Opinion).

Nicholas C. Harris et al. "Efficient, Compact and Low Loss Thermo-optic Phase Shifter in Silicon", Physics. Optics, 2014, 6 pages.

O. Dubray et al. "20Gb/s PAM-4 Transmission from 35 to 90° C. by modulating a Silicon Ring Resonator Modulator with 2Vpp", OFC 2015, OSA 2015, 2015, 3 pages.

Bishanka Brata Bhowmik et al. "Silicon Micro-Ring Resonator Based 16-Qam Modulator for WDM Transmission Systems", 2013 IEEE, 5 pages.

M. Ashkan Seyedi et al. "Data Rate Enhancement of Dual Silicon Ring Resonator Carrier-Injection Modulators by PAM-4 Encoding", Photonics in Switching 2015, Optical Switching Technology & Devices, 2015, 3 pages.

* cited by examiner

DEVICE FOR MODULATING THE INTENSITY OF AN OPTICAL SIGNAL ON FOUR DIFFERENT LEVELS

The invention relates to a device for modulating the intensity of an optical signal on four different levels.

The intensity of a monochromatic optical signal is the product of the optical field E of this optical signal by the conjugate of this optical field E. The optical field corresponds to the electrical field E in the context of the electromagnetic waves and Maxwell equations. In the case of a polychromatic optical signal, the optical intensity is calculated for each of the wavelengths of this signal. The intensity of the optical signal is expressed in Watts.

The modulation of the intensity of a monochromatic optical signal on four different levels is known by the acronym 4-PAM ("4-Pulse Amplitude Modulation). The 4-PAM modulation modulates only the intensity of the optical signal on four different levels and does not modulate its phase. It offers the advantage of simplifying the production of the receiver. In effect, the latter need only measure an intensity level out of only four different levels to demodulate the optical signal. Thus, this receiver is much simpler than, for example, a receiver implemented in the context of a QAM (Quadrature Amplitude Modulation). In effect, in the latter case, the intensity and the phase of the optical signal are modulated. It is therefore necessary also to synchronise the operation of the receiver with that of the modulation device in order to recover the information coded in the intensity and the phase of the received optical signal.

In the case of the polychromatic optical signals, the 4-PAM modulation can be implemented simultaneously for several monochromatic optical signals of different wavelengths which make up the polychromatic optical signal. Such a modulation is known by the acronym 4-PAM-WDM (4-Pulse Amplitude Modulation—Wavelength Division Multiplexing).

In the following article, a 4-PAM modulation device has already been proposed that uses a resonant ring modulator: Dubray O. et al., "20 Gb/s PAM-4 transmission from 20 to 90° C. by modulating a silicon ring resonator modulator with 2V", Optical Society of America, Mar. 2015. Hereinbelow, this article is referred to by the expression "Dubray 2015".

The modulation device of the Dubray 2015 article offers numerous advantages. In particular, by virtue of the use of a resonant ring modulator its bulk is very small. In particular, its bulk is much smaller than that of the 4-PAM modulation devices using Mach-Zender modulators.

By contrast, to implement the 4-PAM modulation device described in the Dubray 2015 article, it is necessary to generate an electrical control signal for the resonant ring modulator exhibiting four different voltage levels. Each of these voltage levels codes two information bits. To generate such an electrical signal from one or more binary information signals to be transmitted, it is therefore necessary to use a digital-analogue converter. Now, such digital-analogue converters are extremely bulky and consume a lot of energy. That limits the possibilities of application of the 4-PAM modulation device described in the Dubray 2015 article.

Prior art is also known from:
SEYEDI M. ASHKAN et Al: "Data rate enhancement of dual silicon ring resonator carrier-injection modulators by PAM-4 encoding", 2015 International Conference on Photonics in switching, IEEE, 22/9/2015, pages 363-365,
US2008/219614A1,
US2015/316794A1.

The invention aims to remedy this drawback while retaining the advantages of the 4-PAM modulation device of the Dubray 2015 article and, in particular, a small bulk. Its subject is therefore a 4-PAM modulation device.

The above 4-PAM modulation device comprises two resonant ring modulators, each controlled by a binary control signal. Thus, contrary to the 4-PAM modulation device described in the Dubray 2015 article, there is no need to use an electrical signal that can take four different voltage levels. It is consequently not necessary to use a digital-analogue converter capable of generating, from the binary information signal or signals to be transmitted, a corresponding voltage level. In the modulation device claimed, the binary information signal or signals can be directly transmitted to the control ports of the resonant ring modulators. It is consequently no longer necessary to use such a digital-analogue converter to do the 4-PAM modulation while using resonant ring modulators. Consequently, the bulk of the device claimed remains still much smaller than the bulk of the modulation devices using Mach-Zender modulators. Furthermore, the device claimed eliminates the need to have to use a bulky digital-analogue converter to make it operate.

Moreover, the above device combines the optical signals obtained from the second output port of the first resonant ring modulator and from the output port of the second resonant ring modulator. Thus, whatever the state of the first resonant ring modulator, the intensity of the first optical signal to be modulated is always combined constructively with the intensity of the second modulated optical signal. By virtue of that, the four intensity levels of the modulated optical signal extend over a wide intensity range which facilitates the decoding thereof by the receivers.

The embodiments of this device can further offer the following advantages:

Using controllable optical phase-shifters to minimise the phase-shifting between the optical signals to be combined by an optical assembler makes it possible to keep a constructive summing of the optical signals situated at the input of the optical assembler and thus limit the losses of this optical assembler.

Using an electrical tuner to tune the resonant ring modulator to the wavelength of the optical signal to be modulated makes it possible to optimise the operation of this resonant ring modulator and in particular to increase the extinction rate thereof.

Using blocks of resonant ring modulators coupled in series makes it possible to do the 4-PAM-WDM modulation.

Swapping the order in which the resonant ring modulators are placed in the blocks of resonant ring modulators makes it possible to limit the phase-shifting of the optical signals received on the inputs of the optical assemblers.

Placing a first resonant ring modulator before the first optical assembler and a second resonant ring modulator after this first optical assembler makes it possible to space apart the four intensity levels to the maximum. Furthermore, one of the levels corresponds to a zero or negligible intensity.

By using the "Drop" ports of the two resonant ring modulators, it is possible to reduce the variability of the optical signal modulated on four different intensity levels.

Using a power divider which divides into equal parts the intensity of the optical signal received makes it possible to space apart the four intensity levels more evenly.

The invention will be better understood on reading the following description, given purely as a nonlimiting example, and with reference to the drawings in which.

In these figures, the same references are used to designate the same elements. Hereinafter in this description, the features and functions well known to those skilled in the art are not described in detail.

Figure 1:
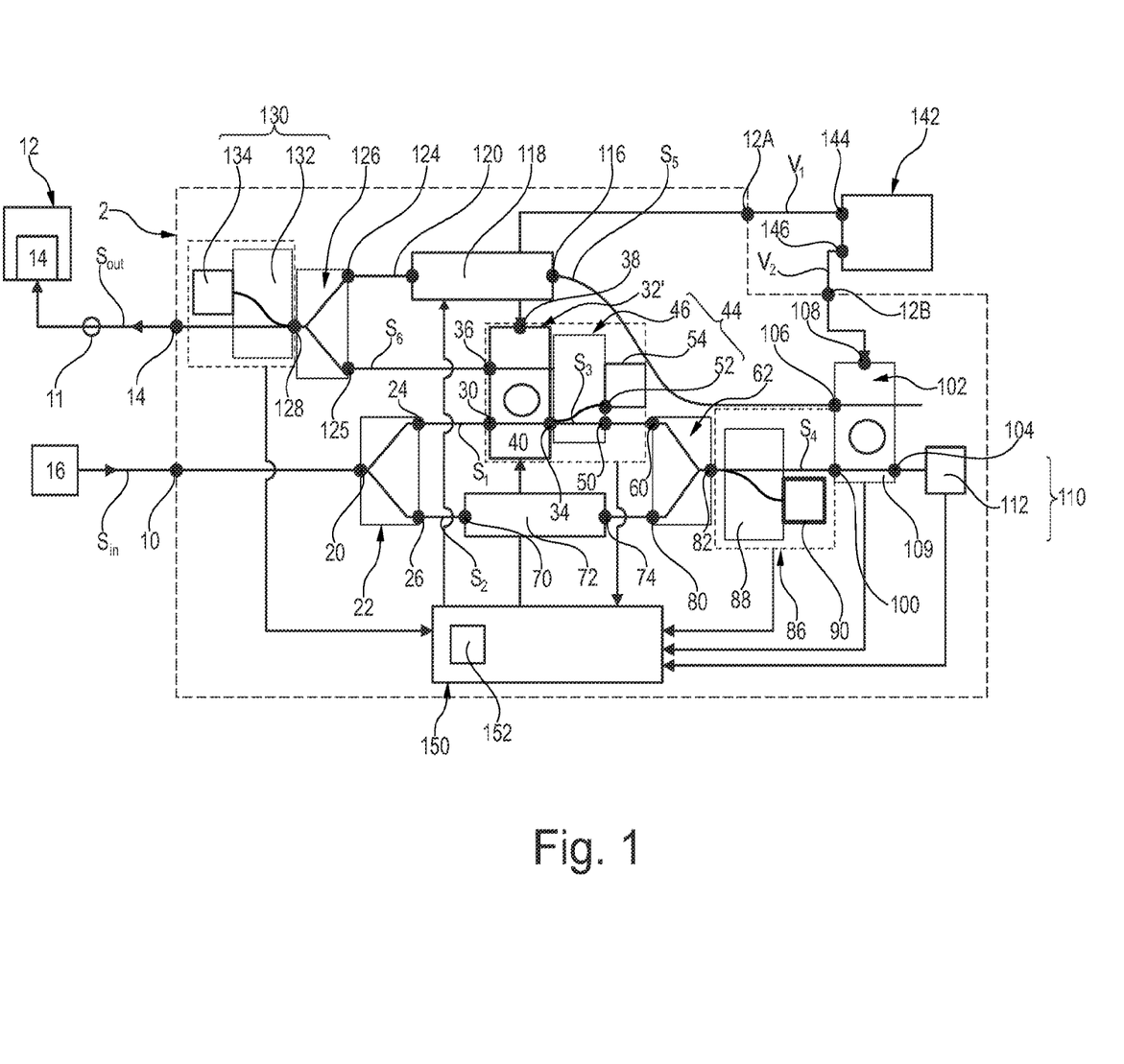
FIG. 1 is a schematic illustration of a 4-PAM modulation device.

FIG. 1 represents a device 2 for 4-PAM modulation of a monochromatic optical signal $S_{in}$ of wavelength $\lambda_{in}$. For example, in this embodiment, the wavelength $\lambda_{in}$ lies between 1510 nm and 1590 nm or between 1270 nm and 1350 nm. However, what is described in this particular case also works for other wavelengths.

The device 2 typically takes the form of an electronic chip in which all the optical and electrical components are produced on one and the same semiconductor substrate such as a piece of silicon. The dimensions of the device 2 are very small. For example, the area of the face on which all its components are produced is less than 2.5 mm² or 1 mm² or 500 μm². Typically, the device 2 is produced by the same fabrication methods as those used to fabricate the microprocessors or other microelectronic devices. The device 2 modulates the intensity of a signal $S_{in}$ as a function of two binary information signals $V_1$ and $V_2$ to be transmitted to obtain a modulated optical signal $S_{out}$. In the signal $S_{out}$, each pair of bits, formed by a bit of the signal $V_1$ and a bit of the signal $V_2$, is coded by a single intensity level of this signal.

Each binary signal is typically an electrical signal in which the value of each information bit is coded by a voltage level. This electrical signal is a binary signal, that is to say that each information bit is coded by its own voltage level and therefore that each voltage level codes only the value of a single information bit.

The signal $S_{out}$ exhibits at most four different intensity levels each coding a different pair of bits. The device 2 does not use the phase of the optical signal to code and transmit information bits.

Typically, the signal $S_{out}$ is transmitted via an optical fibre 11 to a receiver 12. To decode the signal $S_{out}$ received, the receiver 12 only needs a sensor 14 which measures the intensity of the signal $S_{out}$. For example, the sensor 14 is a simple photodetector. Thus, given that the information is only coded by the four intensity levels, the latter is particularly simple to decode on the receiver 12 side.

To this end, the device 2 comprises:
- an input 10 on which the signal $S_{in}$ to be modulated is received;
- inputs 12A and 12B on which the binary information signals $V_1$ and $V_2$ are respectively received;
- an output 14 on which the device 2 delivers the signal $S_{out}$ intensity-modulated as a function of the signals $V_1$ and $V_2$.

The input 10 is optically coupled to an output of a laser source 16 which generates the signal $S_{in}$.

In this text, "optically coupled" describes the fact that two optical components are directly or indirectly coupled to one another via a waveguide or several waveguides. If the two optical components are produced on one and the same silicon substrate, this waveguide is typically a silicon waveguide surrounded by a material with a refractive index that is lower than that of the material of the waveguide. Also, consequently, the expression "directly optically coupled" describes the fact that a first and a second optical component are directly coupled optically to one another by one or more non-instrumented waveguides, that is to say waveguides incapable of modifying the optical signal which passes through them as a function of an external control signal.

The laser source 16 is, for example, an external laser optically coupled to the input 10 by an optical fibre/waveguide coupler. The signal $S_{in}$ delivered by the source 16 is not intensity-modulated or phase-modulated.

The input 10 is directly optically coupled to an input 20 of an optical power divider 22 equipped with two outputs 24 and 26. The divider 22 divides the signal $S_{in}$ into two optical signals to be modulated $S_1$ and $S_2$ delivered, respectively, by the outputs 24 and 26. The two signals $S_1$ and $S_2$ are identical to the signal $S_{in}$ except that they each have an intensity lower than the intensity of the signal $S_{in}$. Here, the intensities of the signals $S_1$ and $S_2$ are respectively denoted $P_1$ and $P_2$. The intensity of the signal $S_{in}$ received on the input 20 is denoted $P_{in}$. The sum of the intensities $P_1$ and $P_2$ is less than or equal to the intensity $P_{in}$. Preferably, the sum of the intensities $P_1$ and $P_2$ is greater than or equal to $0.9 \times P_{in}$ or $0.95 \times P_{in}$ or $0.98 \times P_{in}$. The intensities $P_1$ and $P_2$ are each greater than or equal to $0.05 \times P_{in}$ and, preferably, greater than or equal to $0.15 \times P_{in}$ or $0.25 \times P_{in}$. The divider 22 therefore acts as an intensity divider.

In this embodiment, the intensity $P_{in}$ is divided into equal parts between the outputs 24 and 26. The intensities $P_1$ and $P_2$ are therefore equal.

The divider 22 is for example produced as described in the following article: C. S. Hsiao et AL, "Design for beam splitting components employing silicon-on-insulator rib waveguide structures", Optics letter, C.S. Vol. 30, n° 23, Jan. 12, 2005.

The output 24 is directly optically coupled to an input port 30 of a resonant ring modulator 32 equipped with two output ports 34 and 36. The resonant ring modulators are well known and only a few production and operation principles are reviewed with reference to FIGS. 2 to 4. Conventionally, the ports 30, 34 and 36 are called, respectively, "In" port, "Through" port and "Drop" port. The optical signals which leave the ports 34 and 36 are called, respectively, signal $S_3$ and signal $S_6$. The intensities of the signals $S_3$ and $S_6$ are denoted, respectively, $P_3$ and $P_6$. The modulator 32 also comprises a control port 38.

The modulator 32 switches, in response to an electrical control signal received on its port 38, between an "Off" state, and an "On" state. In the "Off" state, the intensity $P_3$ is maximum and the intensity $P_6$ is minimum. Typically, in the "Off" state, the intensity $P_3$ is at least greater than $0.5 \times P_1$ and, preferably, greater than $0.8 \times P_1$ or $0.9 \times P_1$ and the intensity $P_6$ is at least three or five times less than the intensity $P_1$. Conversely, in the "On" state, the intensity $P_3$ is minimum and the intensity $P_6$ is maximum. Typically, in the "On" state, the intensity $P_6$ is at least greater than $0.5 \times P_1$ and, preferably, greater than $0.8 \times P_1$ or $0.9 \times P_1$ and the intensity $P_3$ is at least three or five times less than the intensity $P_1$. Because of this behaviour of the intensity of the signal $S_6$ in relation to the intensity of the signal $S_3$, it is said that the signal $S_6$ is the complementary signal of the signal $S_3$.

The control signal received on the port 38 is, here, a binary electrical signal $V_1$. The voltage of the signal $V_1$ therefore varies only between two voltage levels $V_{max}$ and $V_{min}$ each of which codes a value of an information bit. For example, $V_{max}$ is equal to 0 Vdc and $V_{min}$ is equal to −3 Vdc. The modulator 32 is in the "On" state when the voltage of the signal $V_1$ is equal to $V_{min}$ and in the "Off" state when the voltage of the signal $V_1$ is equal to $V_{max}$. Thus, in response to the voltage variations of the signal $V_1$, the modulator 32 simultaneously modulates the intensities of the signals $S_3$ and $S_6$.

Figure 3:
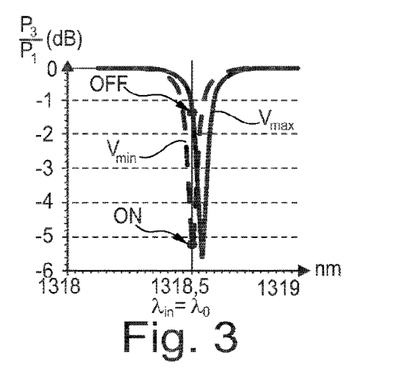
FIGS. 3 and 4 are graphs representing the transfer functions of the resonant ring modulator of FIG. 2.
Figure 4:
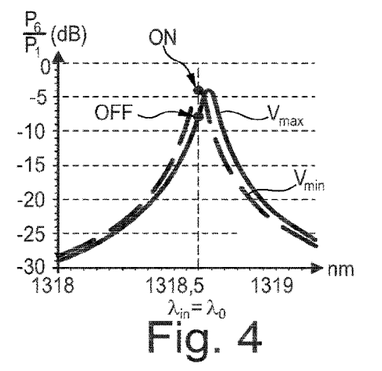

The modulator 32 is associated with a controllable electric tuner 40 capable of modifying the transfer functions $FT_{31}$ and $FT_{61}$ of the intensity between the ports 30, 34 and 36. The function $FT_{31}$ is the transfer function of the intensity of the optical signal between the ports 32 and 34. This function $FT_{31}$ is represented in FIG. 3. The transfer function $FT_{61}$ is the transfer function of the intensity between the ports 32 and 36. This function $FT_{61}$ is represented in FIG. 4.

More specifically, the tuner 40 is capable of shifting the wavelength $\lambda_0$ for which the function $FT_{31}$ exhibits a minimum. This tuner is also capable of at the same time shifting the wavelength $\lambda_0$ for which the function $FT_{61}$ exhibits a maximum. In effect, the functions $FT_{31}$ and $FT_{61}$ are intimately linked and depend on one another. For example, to this end, the tuner 40 comprises a radiator capable of heating up and/or cooling down the modulator 32. In effect, the refractive index of the ring of the modulator 32 varies as a function of the temperature, which therefore modifies its transfer function.

A sensor 44 of the intensity $P_3$ is also provided. For example, the sensor 44 comprises an optical coupler 46 with one input and two outputs 50, 52 as well as a photodetector 54 directly optically coupled to the output 52. The input of the optical coupler 46 is directly optically coupled to the output 34. The output 52 delivers an optical signal identical to the signal $S_3$ but with an intensity that is only a fraction of the intensity of the signal $S_3$. Typically, the intensity of the optical signal delivered by the output 52 is less than 10% and, preferably, less than 5% or 3% of the intensity $P_3$. The output 50 returns the remaining part of the signal $S_3$. After that, the intensity taken by the coupler 46 from the signal $S_3$ is considered as negligible. Consequently, the intensity of the signal $S_3$ delivered by the output 50 is considered as being equal to the intensity $P_3$ of the signal $S_3$ delivered on the output 34.

The photodetector 54 converts the optical signal delivered on the output 52 into an electrical signal representative of the intensity $P_3$. It is this electrical signal which therefore constitutes the measurement of the intensity $P_3$.

The output 50 is directly optically coupled to an input 60 of an optical assembler 62. An optical assembler is also known as "optical combiner" or "optical field combiner".

The output 26 of the divider 22 is directly optically coupled to an input 70 of a controllable phase-shifter 72. The phase-shifter 72 is capable of modifying the phase of the signal $S_2$ as a function of an adjustment electrical signal. The phase-shifter 72 also comprises an output 74 on which it delivers the signal $S_2$, the phase of which has been adjusted. By contrast, the phase-shifter 72 does not modify the intensity $P_2$ of the signal $S_2$.

One possible embodiment of the phase-shifter 72 is described in the following article: Nicholas C. Harris et Al., "Efficient, compact and low loss thermo-optic phase shifter in silicon", Optics Express, 2014.

For example, in a particular embodiment, the phase-shifter 72 comprises:

a waveguide passed through by the signal $S_2$, and a resistive metal arranged in proximity to this waveguide.

In response to the adjustment signal, a potential difference is applied to this resistive metal, which generates heat. The resistive metal therefore varies the temperature of the waveguide and therefore its refractive index. This modifies the phase of the signal $S_2$ which passes through this waveguide.

The output 74 is directly optically coupled to an input 80 of the assembler 62.

The assembler 62 also comprises an output 82 on which it delivers an optical signal $S_4$. The signal $S_4$ results from the field combination of the signals $S_3$ and $S_2$.

Here, the assembler 62 is a summer of optical fields. It therefore adds up the optical fields of the signals $S_3$ and $S_2$ to obtain the signal $S_4$. For example, the assembler 62 is an MMI (Multi-Mode Interference) assembler with two inputs 60, 80 and with one output 82. An MMI assembler is also sometimes called "interferometer". The MMI assemblers are well known. For example, the interested reader can refer to the following article: Lucas B. Soldano et al "Optical multi-mode interference devices based on self-imaging: principles and applications", Journal of Lightwave Technology, Volume 13, n° 4 Apr. 1995.

To limit the losses in the assembler 62, the optical signals received on the inputs 60 and 80 must preferably be in phase. Here, the assembler 62 is an MMI coupler with −3 dB of loss. Consequently, the intensity $P_4$ of the signal $S_4$ as a function of the intensities $P_3$ and $P_2$ is given by the following relationship when the signals $S_3$ and $S_2$ are in phase at the inputs 60 and 80: $P_4 = (\sqrt{P_3} + \sqrt{P_2})^2/2$.

A sensor 86 of the intensity $P_4$ is directly optically coupled to the output 82 of the assembler 62. Here, this sensor 86 is identical to the sensor 44. It therefore comprises an input directly optically coupled to the output 82 and an output which delivers the signal $S_4$ from which a negligible fraction of its intensity has been taken for the measurement. As for the sensor 44, the sensor 86 comprises an optical coupler 88 and a photodetector 90 identical, respectively, to the optical coupler 46 and to the photodetector 54.

The output of the sensor 86 is directly optically coupled to an input port 100 of a resonant ring modulator 102. This modulator 102 is, for example, identical to the modulator 32. It therefore comprises two output ports 104 and 106. The ports 100, 104 and 106 are, respectively, the "In", "Through" and "Drop" ports of the modulator 102.

The modulator 102 also comprises a control port 108 which receives the control binary electrical signal $V_2$. The port 106 delivers an optical signal $S_5$, the intensity of which is denoted $P_5$.

In a way similar to what has been described for the modulator 32, the modulator 102 is associated with a controllable electrical tuner 109. This tuner 109 is identical to the tuner 40 except that it is capable of modifying the transfer functions of the modulator 102 and not those of the modulator 32.

Only a sensor 110 is directly optically coupled to the port 104 of the modulator 102. In particular, no power divider or no optical coupler is directly optically coupled to the port 104. Consequently, in this embodiment, the sensor 110 can use all of the intensity of the signal delivered on this port 104 when the modulator 102 is in its "Off" state. For example, to this end, the sensor 110 comprises a photodetector 112 directly optically coupled to the port 104.

The port 106 is directly optically coupled to an input 116 of a controllable phase-shifter 118. The phase-shifter 118 makes it possible to adjust the phase of the signal $S_5$ as a function of an adjustment signal. The signal $S_5$, the phase of which has been adjusted by the phase-shifter 118, is delivered on an output 120. Here, the structure of the phase-shifter 118 is identical to that of the phase-shifter 72.

The output 120 and the port 36 of the modulator 32 are directly optically coupled, respectively, to inputs 124 and 125 of an optical assembler 126. The assembler 126 recombines the signals $S_5$ and $S_6$ by summing their optical field and delivers the duly obtained optical signal on an output 128. Here, the assembler 126 is, for example, identical to the assembler 62.

A sensor 130 measures the intensity of the optical signal delivered on the output 128. For example, the sensor 130 is identical to the sensor 86 except that its input and its output are directly optically coupled, respectively, to the output 128 and to the output 14. Thus, the sensor 130 measures the intensity $P_{out}$ of the signal $S_{out}$. The coupler and the photodetector of this sensor 130 bear, respectively, the numeric references 132 and 134.

By way of illustration, in this embodiment, the signals $V_1$ and $V_2$ originate from a source 142 of binary electrical signals external to the device 2. The source 142 comprises two outputs 144 and 146 electrically coupled, respectively, to the inputs 12A and 12B to supply the signals $V_1$ and $V_2$ to the device 2. For example, the source 142 comprises two microprocessors which each generate, independently of one another, one of the signals $V_1$ and $V_2$. The outputs 146 and 148 of the source 142 can also correspond to two outputs of a demultiplexer. The inputs 12A and 12B are electrically coupled, respectively, to the ports 38 and 108.

Finally, the device 2 comprises an electronic circuit 150 for adjusting the phase of the signals $S_2$ and $S_5$ and for setting the modulators 32 and 102. The circuit 150 is electrically coupled to the sensors 44, 86, 110 and 130 to receive the intensities measured by these sensors. The circuit 150 is also electrically coupled to the tuners 40 and 109 and to the phase-shifters 72 and 78 to control them. For example, the circuit 150 comprises a programmable microprocessor 152 produced on the same substrate as the other components of the device 2. Here, the microprocessor 152 is programmed to implement the method of FIG. 5.

Figure 2:
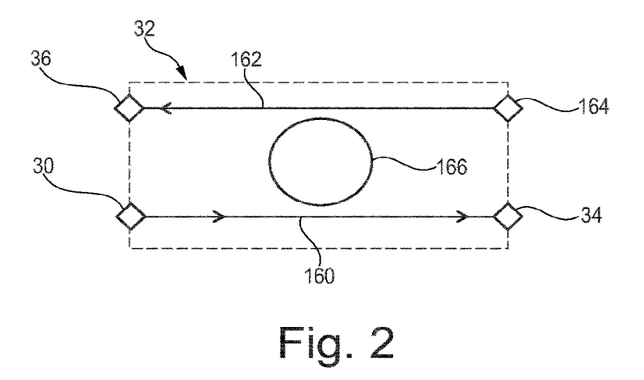
FIG. 2 is a schematic illustration of a resonant ring modulator used in the device of FIG. 1.

FIG. 2 is a simplified representation of the architecture of the modulator 32. The modulator 32 comprises:
- a waveguide 160 which directly optically couples the port 30 to the port 34,
- a waveguide 162, for example parallel to the waveguide 160, which optically couples a port 164 to the port 36, and
- a ring 166 situated between the waveguides 160 and 162.

The port 164 is known as the "Add" port.

The ring 166 is optically coupled on one side to the waveguide 160 and, on another side, to the waveguide 162. A detailed description of such a ring and of its operation is given in the appendix to the application EP2843468. For example, the characteristics of the modulator 32 are as follows:
- the diameter of the ring 166 is 10 μm,
- the efficiency of the modulator 32 is 1.2 V.cm,
- the optical losses of the ring 162 are 15 dB/cm,
- the optical coupling in intensity between the ring 166 and the guide 160 is equal to 3.7%,
- the optical coupling in intensity between the ring 166 and the guide 162 is equal to 2.1%.

FIG. 3 represents the transfer function $FT_{31}$. More specifically, FIG. 3 represents the trend of the ratio of the intensities $P_3/P_1$ as a function of the wavelength $\lambda$ of the optical signal received on the port 32. The curve designated by the indication $V_{min}$ is the function $FT_{31}$ when the control signal is maintained at the level $V_{min}$. Conversely, the curve designated by the symbol $V_{max}$ is the function $FT_{31}$ obtained when the control signal is maintained at the level $V_{max}$. In FIG. 3, the x and y axes are graduated, respectively, in nanometres and in decibels.

The points designated by the symbols "ON" and "OFF" in FIG. 3 correspond to the values of the ratio $P_3/P_1$ in, respectively, the "On" state and the "Off" state of the modulator 32.

In FIG. 3, when the control signal is equal to $V_{min}$, the minimum of the transfer function is produced for a wavelength $\lambda_0$. In the particular case represented in this figure, this wavelength $\lambda_0$ is equal to the wavelength $\lambda_{in}$ of the signal $S_{in}$. In these conditions, it is said that the modulator 32 is tuned to the signal $S_{in}$. When the wavelength $\lambda_{in}$ is equal to $\lambda_0$ in the "On" state, the intensity $P_3$ can no longer be reduced by a new setting of the modulator 32. Conversely, the application of the voltage $V_{max}$ to the port 38 shifts the transfer function to the right such that the wavelength $\lambda_{in}$ is no longer equal to $\lambda_0$ and the ratio $P_3/P_1$ is now several times higher.

In this embodiment, the extinction rate of the modulator 32 for the port 34, that is to say the deviation between the values in decibels of the ratio $P_3/P_1$ in the, respectively, "Off" and "On" states, is equal to 4 dB to within plus or minus 20%. For example, the insertion rate of the modulator 32, that is to say the deviation between 0 dB and the value in decibels of the ratio $P_3/P_1$ in the "Off" state is equal to 1.3 dB to within plus or minus 20%.

FIG. 4 represents the transfer function $FT_{61}$. In the graph of FIG. 4, the same notations as those introduced for the graph of FIG. 3 are used. This graph represents the trend of the ratio of the intensities $P_6/P_1$ as a function of the wavelength of the signal $S_1$. It will be noted that, in the "On" state, the maximum of the function $FT_{61}$ is obtained for the wavelength $\lambda_0$. Furthermore, as for FIG. 3, FIG. 4 is represented in the particular case where the wavelength $\lambda_0$ is equal to the wavelength $\lambda_{in}$. Thus, in the "On" state, the intensity $P_6$ can no longer be increased by a new setting of the modulator 32.

For example, the extinction rate and the insertion rate of the modulator 32 for the port 36 are equal, respectively, to 4 dB and 4.1 dB to within plus or minus 20%.

Figure 5:
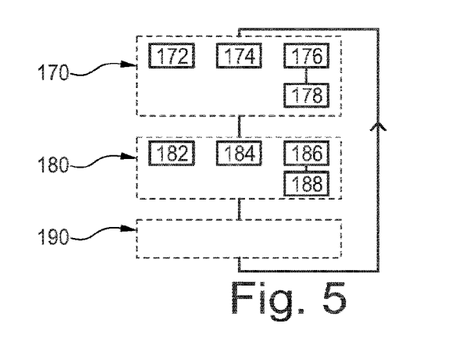
FIG. 5 is a flow diagram of a 4-PAM modulation method using the device of FIG. 1.

The operation of the device 2 will now be described with reference to the method of FIG. 5.

The method begins with a phase 170 of setting of the modulators 32 and 102. For that, in a step 172, the source 142 is controlled to maintain, throughout the duration of the phase 170, the modulators 32 and 102 in their "On" state. In other words, the signals $V_1$ and $V_2$ are each maintained at their level $V_{min}$.

In parallel, throughout the duration of the phase 170, in a step 174, the sensors 44 and 110 measure the intensities of the optical signals delivered on the ports, respectively, 34 and 104. These sensors transmit the measured intensities to the circuit 150.

Also in parallel, in a step 176, the circuit 150 sets the modulator 32. To this end, the circuit 150 controls the tuner 40 to progressively shift the transfer function $FT_{31}$ and, in particular, the wavelength $\lambda_0$ for which this transfer function exhibits a minimum. Thus, when the wavelength $\lambda_0$ approaches the wavelength $\lambda_{in}$ of the signal $S_{in}$, the intensity measured in parallel by the sensor 44 decreases. Conversely, as soon as the wavelength $\lambda_0$ moves away from the wavelength $\lambda_{in}$, the intensity measured in parallel by the sensor 44 increases. The circuit 150 therefore varies the wavelength $\lambda_0$ until the latter corresponds to a power minimum measured by the sensor 44. When the intensity measured by the sensor 44 is minimum, the wavelength $\lambda_0$ is equal to the wavelength $\lambda_{in}$ and the extinction rate of the modulator 32 is maximised. The control signal of the tuner 40 which minimises the intensity measured by the sensor 44 when the modulator 32 is in the "On" state is then stored.

Then, in a step 178, the circuit 150 sets the modulator 102. This step 178 is identical to the step 176 except that it is the sensor 110 and the tuner 109 which are used instead, respectively, of the sensor 44 and of the tuner 40.

Next, in a phase 180, the circuit 150 adjusts the phases of the signals $S_2$ and $S_5$ for these signals to be in phase, at the inputs 80 and 124, with, respectively, the signals $S_3$ and $S_6$.

For that, in a step 182, the source 142 is controlled to maintain, throughout the duration of the phase 180, the modulators 32 and 102 in their "Off" state.

In parallel, in a step 184, the sensors 86 and 130 permanently measure the intensities $P_4$ and $P_{out}$. These sensors transmit in real time their measurements to the circuit 150.

In a step 186, the circuit 150 adjusts the phase of the signal $S_2$ for it to be equal to the phase of the signal $S_3$ at the inputs of the assembler 62. For that, the circuit 150 controls the phase-shifter 72 to progressively vary the phase of the signal $S_2$. When the phase of the signal $S_2$ approaches the phase of the signal $S_3$ at the inputs 60, 80, the intensity measured by the sensor 86 increases. Conversely, when the phase-shift between the signals $S_2$ and $S_3$ increases at the inputs 60 ad 80, the intensity measured by the sensor 86 decreases. The circuit 150 therefore varies the adjustment signal of the phase-shifter 72 until the adjustment signal which maximises the intensity measured by the sensor 86 is found. This adjustment signal found is then stored.

Next, in a step 188, the circuit 150 adjusts the phase of the signal $S_5$ for it to be in phase with the signal $S_6$ at the inputs of the assembler 126. The step 188 is identical to the step 186 except that it is the phase-shifter 118 and the sensor 130 which are used instead of the phase-shifter 72 and the sensor 86.

Once the device 2 has been calibrated, the method continues with a phase 190 of modulation of the intensity of the signal $S_{in}$ on four different levels as a function of the signals $V_1$ and $V_2$ to be transmitted. Throughout the duration of this phase 190, the circuit 150 applies to the modulators 32 and 102 the setting signal stored in the phase 170 and also applies the adjustment signal stored in the phase 180 to the phase-shifters 72 and 118.

In the phase 190, the signals $V_1$ and $V_2$ are applied to the input ports 38 and 108 of the modulators 32 and 102 respectively.

In parallel, the laser source 16 generates the signal $S_{in}$ and transmits it to the input 10 of the device 2. The signal $S_{in}$ is then divided into two signals $S_1$ and $S_2$ of the same power by the divider 22. The intensity of the signal $S_1$ is then modulated by the modulator 32 as a function of the control signal $V_1$ so as to obtain the modulated optical signal $S_3$. The signal $S_3$ is then combined with the signal $S_2$ by the assembler 62 to obtain the signal $S_4$ received on the port 100 of the modulator 102. At the same time, the complementary signal of the signal $S_3$, that is to say the signal $S_6$, is delivered on the port 36.

The module 102 once again modulates the intensity of the signal $S_4$, but this time as a function of the control signal $V_2$ to obtain the signal $S_5$.

The signals $S_5$ and $S_6$ are then combined together by the assembler 126 to obtain the signal $S_{out}$, the intensity of which is modulated on four different levels. In the signal $S_{out}$, each intensity level codes both the value of a bit of the signal $V_1$ and of a bit of the signal $V_2$.

The table below presents, for each possible combination of the states of the modulators 32 and 102, the values of the intensities $P_1$ to $P_6$ and $P_{out}$ calculated for a power $P_{in}$ of the signal $S_{in}$. To simplify this calculation, the losses of intensities in the optical components of the device 2 have all been disregarded except those caused by the optical assemblers 62 and 130. Consequently, for the calculation of the intensity $P_{out}$ of the signal $S_{out}$, the contribution of the maximum intensity of the optical signals $S_3$, $S_5$ and $S_6$ is considered as negligible. Thus, in the table below, the minimum intensity of these signals is taken to be equal to 0 W.

| | Numeric reference of the modulator | | | | | | |
|---|---|---|---|---|---|---|---|
| 32 | 102 | 32 | 102 | 32 | 102 | 32 | 102 |
| | | | State | | | | |
| Off | Off | On | Off | Off | On | On | On |
| $P_1$ | $P_{in}/2$ | | $P_{in}/2$ | | $P_{in}/2$ | | $P_{in}/2$ |
| $P_2$ | $P_{in}/2$ | | $P_{in}/2$ | | $P_{in}/2$ | | $P_{in}/2$ |
| $P_3$ | $P_{in}/2$ | | 0 | | $P_{in}/2$ | | 0 |
| $P_4$ | $P_{in}$ | | $P_{in}/4$ | | $P_{in}$ | | $P_{in}/4$ |
| $P_5$ | 0 | | 0 | | $P_{in}$ | | $P_{in}/4$ |
| $P_6$ | 0 | | $P_{in}/2$ | | 0 | | $P_{in}/2$ |
| $P_{out}$ | 0 | | $P_{in}/4$ | | $P_{in}/2$ | | $0.73 \times P_{in}$ |

The intensity range over which the four intensity levels are distributed therefore extends from 0 to $0.73 \times P_{in}$. Furthermore, the four possible intensity levels are practically uniformly distributed over this intensity range.

At predetermined intervals, the circuit 150 once again reiterates the phases 170 and 180 to permanently adapt the calibration of the device 2 to the current operating conditions of this device 2.

Figure 6:
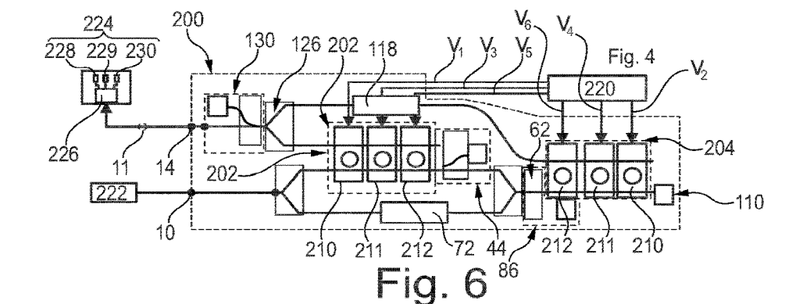
FIGS. 6 to 9 are schematic illustrations of different variants of the device of FIG. 1.

FIG. 6 represents a 4-PAM-WDM (Wavelength Division Multiplexing) modulation device 200. The device 200 is identical to the device 2 except that the modulators 32 and 102 are each replaced by blocks, respectively 202 and 204, of resonant ring modulators. Each block 202, 204 comprises N resonant ring modulators optically coupled in series one after the other, where N is an integer strictly greater than or equal to two. "Coupled in series" here describes the fact that:

the "Through" port of the preceding modulator is directly optically coupled to the "In" port of the next modulator, and the "Add" port of the preceding modulator is directly optically coupled to the "Drop" port of the next modulator.

Here, the block 202 comprises three resonant ring modulators 210 to 212. These modulators 210 to 212 are identical to the modulator 32 except that the wavelengths, respectively denoted $\lambda_1$, $\lambda_2$ and $\lambda_3$, for which their transfer functions exhibit a minimum are different. Here, the wavelengths $\lambda_1$, $\lambda_2$ and $\lambda_3$ are spaced apart from one another by an interval $\Delta$ greater than or equal to 1 nm and, preferably, greater than or equal to 2 or 5 nm. Furthermore, generally, the interval $\Delta$ is less than or equal to 10 nm or 15 nm. Thus, the modulator 210 is incapable of modulating the intensity of the optical signals at the wavelengths $\lambda_2$ and $\lambda_3$. The same applies for the modulators 211 and 212 which cannot modulate the optical signal at the wavelength $\lambda_1$. Consequently, the series connection of the modulators 210 to 212 in no way alters the modulation method for a given wavelength of the signal $S_{in}$.

The block 204 comprises the same modulators 210 to 212 coupled in series. However, here, in the direction of circulation of the optical signal which passes through the "Through" ports of these modulators, the modulators 210 to 212 are arranged in reverse direction relative to that which was done in the block 202.

Each of the modulators of the blocks 202 and 204 is controlled by its own control binary electrical signal. Here, these control binary electrical signals are denoted $V_1$, $V_2$, $V_3$, $V_4$, $V_5$ and $V_6$. To generate these signals $V_1$, $V_2$, $V_3$, $V_4$, $V_5$ and $V_6$, the source 142 is replaced by a source 220 of binary electrical signals which generates the six signals $V_1$ to $V_6$.

To simplify FIG. 6, the control electronic circuit and the electrical tuners associated with each of the modulators 210 to 212 have not been represented. Everything which has been described with reference to the tuners 40 and 109 and to the circuit 150 of the device 2 can be transposed without difficulty to the embodiment of FIG. 6.

For each wavelength $\lambda_1$, $\lambda_2$ and $\lambda_3$, the operation of the device 200 is the same as that of the device 2. It will however be noted, in the case of the device 200, the laser source 16 has to be replaced by a multichromatic laser source 222 which simultaneously generates three monochromatic optical signals not modulated at the wavelengths $\lambda_1$, $\lambda_2$ and $\lambda_3$. For example, to this end, the source 222 comprises three monochromatic sources of different multiplexed wavelengths. Similarly, the receiver 12 has to be replaced by a receiver 224. The receiver 224 typically comprises a wavelength demultiplexer 226 which isolates the optical signals at the wavelengths $\lambda_1$, $\lambda_2$ and $\lambda_3$. This demultiplexer 226 then transmits the optical signal isolated at each of these wavelengths $\lambda_1$, $\lambda_2$ and $\lambda_3$ to respective photo detectors 228 to 230.

Figure 7:
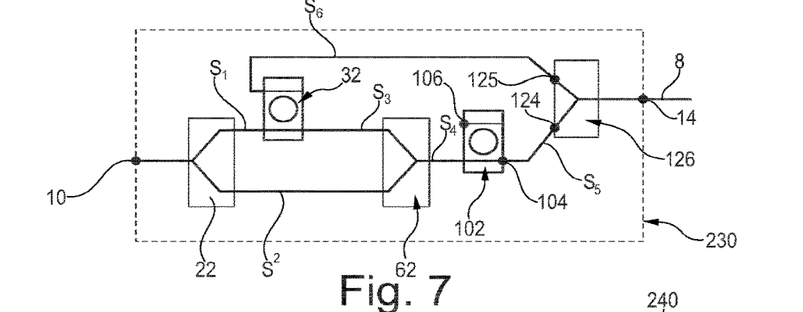
Figure 8:
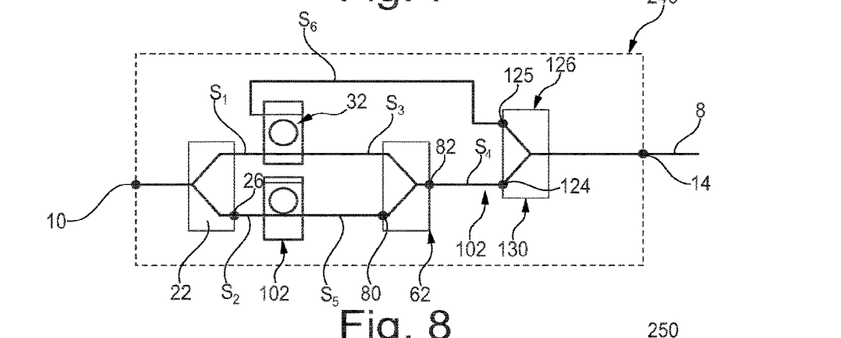
Figure 9:
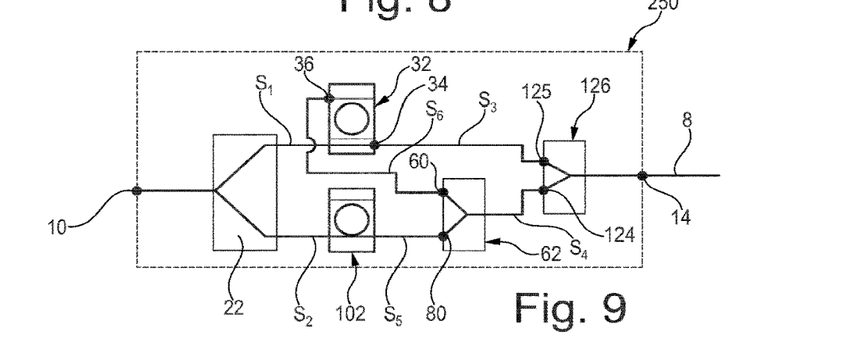

It is possible to arrange the modulators and the optical assemblers of the device 2 differently to obtain variations of this device 2 which offer the same advantages and, in particular, a small bulk and four intensity levels distributed over a wide intensity range. Three examples of such variants are represented in FIGS. 7 to 9. To simplify the description of these variant arrangements, in FIGS. 7 to 9, only the divider 22, the assemblers 62 and 126 and the modulators 32 and 102 are represented. The arrangement of the other optical or electrical components can easily be deduced from the description of the device 2.

FIG. 7 represents a 4-PAM modulation device 230 identical to the device 2 except that the roles of the ports 104 and 106 of the modulator 102 have been reversed. Thus, the port 104 is optically coupled to the input 124 of the assembler 126. Conversely, the port 106 is no longer optically coupled to this input 124. For example, the port 106 is only optically coupled to the sensor 110. In this embodiment, the signal $S_5$ is delivered by the port 104 and no longer by the port 106.

The table below summarises the values of the intensities $P_1$ to $P_6$ and $P_{out}$ obtained for the different possible states of the modulators 32 and 102 of the device 230.

| | Numeric reference of the modulator | | | | | | | |
|---|---|---|---|---|---|---|---|---|
| | 32 | 102 | 32 | 102 | 32 | 102 | 32 | 102 |
| | | | | State | | | | |
| | Off | Off | On | Off | Off | On | On | On |
| $P_1$ | $P_{in}/2$ | | $P_{in}/2$ | | $P_{in}/2$ | | $P_{in}/2$ | |
| $P_2$ | $P_{in}/2$ | | $P_{in}/2$ | | $P_{in}/2$ | | $P_{in}/2$ | |
| $P_3$ | $P_{in}/2$ | | 0 | | $P_{in}/2$ | | 0 | |
| $P_4$ | $P_{in}$ | | $P_{in}/4$ | | $P_{in}$ | | $P_{in}/4$ | |
| $P_5$ | $P_{in}$ | | $P_{in}/4$ | | 0 | | 0 | |
| $P_6$ | 0 | | $P_{in}/2$ | | 0 | | $P_{in}/2$ | |
| $P_{out}$ | $P_{in}/2$ | | $0.73 \times P_{in}$ | | 0 | | $P_{in}/4$ | |

In the device 230, the port 106 of the modulator 126 is not used. That increases the variability of the signal $S_{out}$.

FIG. 8 represents a device 240 identical to the device 2 except that the modulator 102 has been placed between the output 26 of the divider 22 and the input 80 of the assembler 62. There is therefore no longer a modulator situated between the output 82 of the assembler 62 and the input 124 of the assembler 126. In this embodiment, the assembler 62 combines the signals $S_3$ and $S_5$ and the assembler 126 combines the signals $S_4$ and $S_6$.

The table below summarises the values of the intensities $P_1$ to $P_6$ and $P_{out}$ obtained for the different possible states of the modulators 32 and 102 of the device 240.

| | Numeric reference of the modulator | | | | | | | |
|---|---|---|---|---|---|---|---|---|
| | 32 | 102 | 32 | 102 | 32 | 102 | 32 | 102 |
| | | | | State | | | | |
| | Off | Off | On | Off | Off | On | On | On |
| $P_1$ | $P_{in}/2$ | | $P_{in}/2$ | | $P_{in}/2$ | | $P_{in}/2$ | |
| $P_2$ | $P_{in}/2$ | | $P_{in}/2$ | | $P_{in}/2$ | | $P_{in}/2$ | |
| $P_3$ | $P_{in}/2$ | | 0 | | $P_{in}/2$ | | 0 | |
| $P_4$ | $P_{in}$ | | $P_{in}/4$ | | $P_{in}/4$ | | 0 | |
| $P_5$ | $P_{in}/2$ | | $P_{in}/2$ | | 0 | | 0 | |
| $P_6$ | 0 | | $P_{in}/2$ | | 0 | | $P_{in}/2$ | |
| $P_{out}$ | $P_{in}/2$ | | $0.73 \times P_{in}$ | | $P_{in}/8$ | | $P_{in}/4$ | |

As the table above shows, in the embodiment of FIG. 8, the four intensity levels of the signal $S_{out}$ are less spaced apart from one another than in the preceding embodiments. Furthermore, in this embodiment, none of the intensity levels is equal to zero.

FIG. 9 represents a device 250 identical to the device 240 except that:
  the port 34 of the modulator 32 is directly optically coupled to the input 125 of the assembler 126, and
  the port 36 of the modulator 32 is directly optically coupled to the input 60 of the assembler 62.

The table below indicates the values of the intensities $P_1$ to $P_6$ and $P_{out}$ obtained for the different possible states of the modulators 32 and 102 of the device 250.

| | Numeric reference of the modulator | | | | | | | |
|---|---|---|---|---|---|---|---|---|
| | 32 | 102 | 32 | 102 | 32 | 102 | 32 | 102 |
| | | | | State | | | | |
| | Off | Off | On | Off | Off | On | On | On |
| $P_1$ | $P_{in}/2$ | | $P_{in}/2$ | | $P_{in}/2$ | | $P_{in}/2$ | |
| $P_2$ | $P_{in}/2$ | | $P_{in}/2$ | | $P_{in}/2$ | | $P_{in}/2$ | |
| $P_3$ | $P_{in}/4$ | | 0 | | $P_{in}/2$ | | 0 | |
| $P_4$ | $P_{in}/4$ | | $P_{in}$ | | 0 | | $P_{in}/4$ | |
| $P_5$ | $P_{in}/2$ | | $P_{in}/2$ | | 0 | | 0 | |
| $P_6$ | 0 | | $P_{in}/2$ | | 0 | | $P_{in}/2$ | |
| $P_{out}$ | $0.73 \times P_{in}$ | | $P_{in}/2$ | | $P_{in}/4$ | | $P_{in}/8$ | |

In each embodiment, the role and the optical couplings of the two output ports of the same modulator can be reversed. That is for example what has been done to switch from the embodiment of FIG. 8 to that of FIG. 9.

Many other embodiments are possible. For example, the divider 22 can be replaced by any other type of optical component making it possible to divide the intensity of the signal $S_{in}$. In particular, this power divider can be replaced by a Y-junction.

It is not necessary for the divider 22 to uniformly distribute the intensity of the signal $S_{in}$ between the signals $S_1$ and $S_2$. As a variant, the intensities of the signals $S_1$ and $S_2$ are different. For example, preferably, the intensity $P_1$ is strictly greater than the intensity $P_2$. Thus, in other embodiments, the intensity $P_1$ is greater than $1.5 \times P_2$ or $2 \times P_2$. For example, in a particular case, the intensity $P_{in}$ is equal to $\frac{2}{3} \times P_{in}$ and the intensity $P_2$ is equal to $\frac{1}{3} \times P_{in}$. In this case, the four intensity levels are no longer uniformly spaced apart from one another.

The optical assemblers such as the assemblers 62 and 126 can exhibit losses different from −3 dB. For example, there are optical assemblers with losses that are higher or, on the contrary lower. These assemblers can be used in place of the assemblers 62 and 126.

In place of the modulators described, it is possible to use modulators that are identical but in which the "On" state is obtained when the voltage applied to the control port is equal to $V_{min}$ and the "Off" state is obtained by applying the voltage $V_{max}$. It is then necessary to adapt the control signal accordingly if necessary.

The binary control signal of the modulators is not necessarily an electrical signal. As a variant, it is replaced by a mechanical signal which switches a modulator between its "Off" and "On" states.

The fibre 11 can be replaced by a silicon or polymer waveguide produced on the same chip as that of the device 2 if the receiver 12 is also located on this chip.

In the device 200, the order in which the resonant ring modulators are coupled to one another in each block 202, 204 can be modified.

There are numerous possible embodiments for the resonant ring modulators 32 and 102. For example, as a variant, each of these modulators is produced as described in the application EP2843468. In this case, each modulator does not modify the phase of the optical signal that it modulates in intensity. Consequently, the phase-shifters 72 and 118 and the sensors 86 and 130 can be omitted because they are no longer necessary.

The phase-shifters 72 and 118 can be coupled to the other input of the assembler. In another variant, a phase-shifter is placed in front of each input of the assemblers 62 and 126. Other embodiments of an optical phase-shifter are possible. For example, one such other embodiment is described in the application EP1782123.

It is also possible to omit one or more of the optical phase-shifters. For example, it is possible to omit the phase-shifter 72 if the length of the waveguide between the output 24 and the input 80 has been adjusted to compensate the phase-shift introduced by the modulator 32. By proceeding likewise, it is also possible to omit the phase-shifter 118.

In another embodiment, at least one of the tuners 40, 109 is omitted. In this case, the sensor 44 or 110 used to control this tuner is also omitted.

The sensor 44 can be directly coupled to the port 36 to measure the intensity $P_6$ instead of the intensity $P_3$. In this case, the modulator 32 is tuned to the wavelength $\lambda_{in}$ when the intensity of the signal $S_6$ is maximum and the modulator 32 is in its "On" state.

The invention claimed is:

1. Device for modulating the intensity of an optical signal on four different levels, wherein the device comprises:
   a power divider comprising an input to receive an initial optical signal to be modulated and first and second outputs which each deliver, respectively, first and second optical signals to be modulated, the intensity of each of these first and second optical signals to be modulated being equal to a non-zero fraction of the intensity of the initial optical signal received on the input of the power divider,
   a first resonant ring modulator comprising:
     an input port optically coupled to the first output of the power divider to receive the first optical signal to be modulated,
     a first output port configured to deliver a first intensity-modulated optical signal, constructed by modulating the intensity of the optical signal received on the input port between only a high level and a low level,
     a control port configured to receive a first binary control signal in response to which the first resonant ring modulator varies the intensity of the first optical signal to be modulated between the high and low levels to obtain the first modulated optical signal,
     a second output configured to deliver an optical signal complementary to the first modulated optical signal, the intensity of the complementary optical signal being at the low level when the intensity of the first modulated optical signal is at the high level and vice versa,
   second resonant ring modulator comprising:
     an input port optically coupled to the second output of the power divider to receive the second optical signal to be modulated,
     an output port configured to deliver a second modulated optical signal constructed by modulating the intensity of the optical signal received on its input port between only a high level and a low level,
     a control port configured to receive a second binary control signal in response to which the second resonant ring modulator varies the intensity of the optical signal received on its input port between the high and low levels to obtain the second modulated optical signal,
   a first optical assembler comprising:
     a first input optically coupled to one of the first and second output ports of the first resonant ring modulator to receive the first modulated optical signal,
     a second input optically coupled to the output port of the second resonant ring resonator modulator to receive the second modulated optical signal, and
     an output configured to generate a first combined optical signal constructed by combining optical signals received on the first and second inputs of the first optical assembler,
   a second optical assembler comprising:
     a first input optically coupled to the output port of the first optical assembler
     a second input optically coupled to the other of the first and second output ports of the first resonant ring modulator, and
     an output configured to deliver the optical signal of which the intensity is modulated on at most four different levels constructed by combining optical signals received on its first and second inputs.

2. Device according to claim 1, in which, for at least one of the first and second optical assemblers, the device comprises:
- a controllable optical phase-shifter coupled to one of the inputs of this optical assembler so as to be passed through by the optical signal which is combined by this optical assembler with the optical signal received on the other of its inputs, this optical phase-shifter being capable of modifying the phase of the optical signal which passes through it by a predetermined quantity set by an adjustment signal,
- a sensor capable of measuring the intensity of the optical signal restored on the output of this optical assembler, and
- an electronic circuit configured to acquire the intensity measured by the sensor and to generate, as a function of the acquired measured intensity, a phase-shifter adjustment signal which maximises the intensity of the signal delivered on the output of the optical assembler.

3. Device according to claim 1, in which, for at least one of the resonant ring modulators the device comprises:
- an electrical tuner capable of modifying, for a constant value of the control signal of this modulator, wavelength $\lambda_0$ for which a transfer function between the intensities of the optical signals received on the input and output ports of this resonant ring modulator exhibits a minimum, this electrical tuner being capable of shifting this wavelength $\lambda_0$ by a predetermined quantity set by a setting signal,
- a sensor of the intensity of the optical signal delivered on an output port of this ring modulator, and
- an electronic circuit configured to acquire the intensity measured by the sensor and to generate, as a function of this acquired measured intensity, a setting signal which minimises the intensity delivered on this output port.

4. Device according to claim 1, in which:
- the first and second resonant ring modulators are capable of modulating the intensity of an optical signal at a wavelength $\lambda_1$ and, simultaneously, incapable of modulating the intensity of an optical signal at a wavelength $\lambda_2$ spaced apart from the wavelength $\lambda_1$ by at least 1 nm,
- the device also comprises third and fourth resonant ring modulators capable of modulating the intensity of an optical signal at the wavelength $\lambda_2$ and, simultaneously, incapable of modulating the intensity of an optical signal at the wavelength $\lambda_1$, the third resonant ring modulator being optically coupled in series with the first resonant ring modulator to form a first modulation block capable of modulating the intensity of the first optical signal to be modulated at the same time as the wavelengths $\lambda_1$ and $\lambda_2$, the fourth resonant ring modulator being optically coupled in series with the second resonant ring modulator to form a second modulation block capable of modulating the intensity of the optical signal constructed from the second optical signal to be modulated at the same time as the wavelengths $\lambda_1$ and $\lambda_2$.

5. Device according to claim 4, in which, in a direction of circulation of the optical signal through the second modulation block, the resonant ring modulators of the second modulation block are arranged in a reverse order to an order of the resonant ring modulators of the first modulation block.

6. Device for modulating the intensity of an optical signal on four different levels, wherein the device comprises:
- a power divider comprising an input to receive an initial optical signal to be modulated and first and second outputs which each deliver, respectively, first and second optical signals to be modulated, the intensity of each of these first and second optical signals to be modulated being equal to a non-zero fraction of the intensity of the initial optical signal received on the input of the power divider,
- a first resonant ring modulator comprising:
  - an input port optically coupled to the first output of the power divider to receive the first optical signal to be modulated,
  - a first output port capable of delivering a first intensity-modulated optical signal, constructed by modulating the intensity of the optical signal received on the input port between only a high level and a low level,
  - a control port capable of receiving a first binary control signal in response to which the first resonant ring modulator varies the intensity of the first optical signal to be modulated between the high and low levels to obtain the first modulated optical signal,
  - a second output port capable of delivering an optical signal complementary to the first modulated optical signal, the intensity of the complementary optical signal being at the low level when the intensity of the first modulated optical signal is at the high level and vice versa,
- a first optical assembler comprising:
  - a first input optically coupled to one of the first and second output ports of the first resonant ring modulator to receive the first modulated optical signal,
  - a second input optically coupled to the second output of the power divider to receive an optical signal constructed from the second optical signal to be modulated, and
  - an output for restoring a first combined optical signal constructed by combining the optical fields of the optical signals received on the first and second inputs of the first optical assembler,
- a second resonant ring modulator comprising:
  - an input port to receive an optical signal constructed from the second optical signal to be modulated,
  - an output port capable of delivering a second modulated optical signal constructed by modulating the intensity of the optical signal received on its input port between only a high level and a low level,
  - a control port capable of receiving a second binary control signal in response to which the second resonant ring modulator varies the intensity of the optical signal received on its input port between the high and low levels to obtain the second modulated optical signal,
- a second optical assembler comprising:
  - a first input optically coupled to the output port of the second resonant ring modulator,
  - a second input optically coupled to the other of the first and second output ports of the first resonant ring modulator, and
  - an output capable of delivering the optical signal of which the intensity is modulated on four different levels constructed by combining the optical signals received on its first and second inputs, in which:
    - the second input of the first optical assembler is optically coupled to the second output of the power divider so as to receive the second optical signal to be modulated before the second optical signal is modulated by the second resonant ring modulator, and the input port of the second resonant ring modulator is optically coupled to the output of the first optical assembler to receive the first combined optical signal.

7. Device according to claim 6, in which the second output port of the first resonant ring modulator and the output port of the second resonant ring modulator are both Drop ports of a resonant ring modulator.

8. Device according to claim 1, in which the optical assemblers are MMI (Multi-Mode Interference) optical assemblers with only two inputs and one output.

9. Device according to claim 1, in which the power divider is arranged to divide into equal parts the intensity of the optical signal received on its input such that the intensities of the first and second optical signals to be modulated are equal.

10. Device according to claim 1, in which the power divider is an MMI (Multi-Mode Interference) assembler with only one input and two outputs.

11. Device according to claim 6, in which, for at least one of the first and second optical assemblers, the device comprises:
a controllable optical phase-shifter coupled to one of the inputs of this optical assembler so as to be passed through by the optical signal which is combined by this optical assembler with the optical signal received on the other of its inputs, this optical phase-shifter being capable of modifying the phase of the optical signal which passes through it by a predetermined quantity set by an adjustment signal,
a sensor capable of measuring the intensity of the optical signal restored on the output of this optical assembler, and
an electronic circuit configured to acquire the intensity measured by the sensor and to generate, as a function of the acquired measured intensity, a phase-shifter adjustment signal which maximises the intensity of the signal delivered on the output of the optical assembler.

12. Device according to claim 6, in which, for at least one of the resonant ring modulators the device comprises:
an electrical tuner capable of modifying, for a constant value of the control signal of this modulator, wavelength $\lambda_0$ for which a transfer function between the intensities of the optical signals received on the input and output ports of this resonant ring modulator exhibits a minimum, this electrical tuner being capable of shifting this wavelength $\lambda_0$ by a predetermined quantity set by a setting signal,
a sensor of the intensity of the optical signal delivered on an output port of this ring modulator, and
an electronic circuit configured to acquire the intensity measured by the sensor and to generate, as a function of this acquired measured intensity, a setting signal which minimises the intensity delivered on this output port.

13. Device according to claim 6, in which:
the first and second resonant ring modulators are capable of modulating the intensity of an optical signal at a wavelength $\lambda_1$ and, simultaneously, incapable of modulating the intensity of an optical signal at a wavelength $\lambda_2$ spaced apart from the wavelength $\lambda_1$ by at least 1 nm,
the device also comprises third and fourth resonant ring modulators capable of modulating the intensity of an optical signal at the wavelength $\lambda_2$ and, simultaneously, incapable of modulating the intensity of an optical signal at the wavelength $\lambda_1$, the third resonant ring modulator being optically coupled in series with the first resonant ring modulator to form a first modulation block capable of modulating the intensity of the first optical signal to be modulated at the same time as the wavelengths $\lambda_1$ and $\lambda_2$, the fourth resonant ring modulator being optically coupled in series with the second resonant ring modulator to form a second modulation block capable of modulating the intensity of the optical signal constructed from the second optical signal to be modulated at the same time as the wavelengths $\lambda_1$ and $\lambda_2$.

14. Device according to claim 6, in which the optical assemblers are MMI (Multi-Mode Interference) optical assemblers with only two inputs and one output.

15. Device according to claim 6, in which the power divider is arranged to divide into equal parts the intensity of the optical signal received on its input such that the intensities of the first and second optical signals to be modulated are equal.

16. Device according to claim 6, in which the power divider is an MMI (Multi-Mode Interference) assembler with only one input and two outputs.

* * * * *

UNITED STATES PATENT AND TRADEMARK OFFICE
CERTIFICATE OF CORRECTION

PATENT NO. : 10,142,029 B2
APPLICATION NO. : 15/345836
DATED : November 27, 2018
INVENTOR(S) : Olivier Dubray et al.

Page 1 of 1

It is certified that error appears in the above-identified patent and that said Letters Patent is hereby corrected as shown below:

In the Claims

In Column 14, Line 61 of Claim 1, "port" should be deleted after "output".

Signed and Sealed this
Tenth Day of September, 2019

Andrei Iancu
*Director of the United States Patent and Trademark Office*